UNITED STATES PATENT OFFICE.

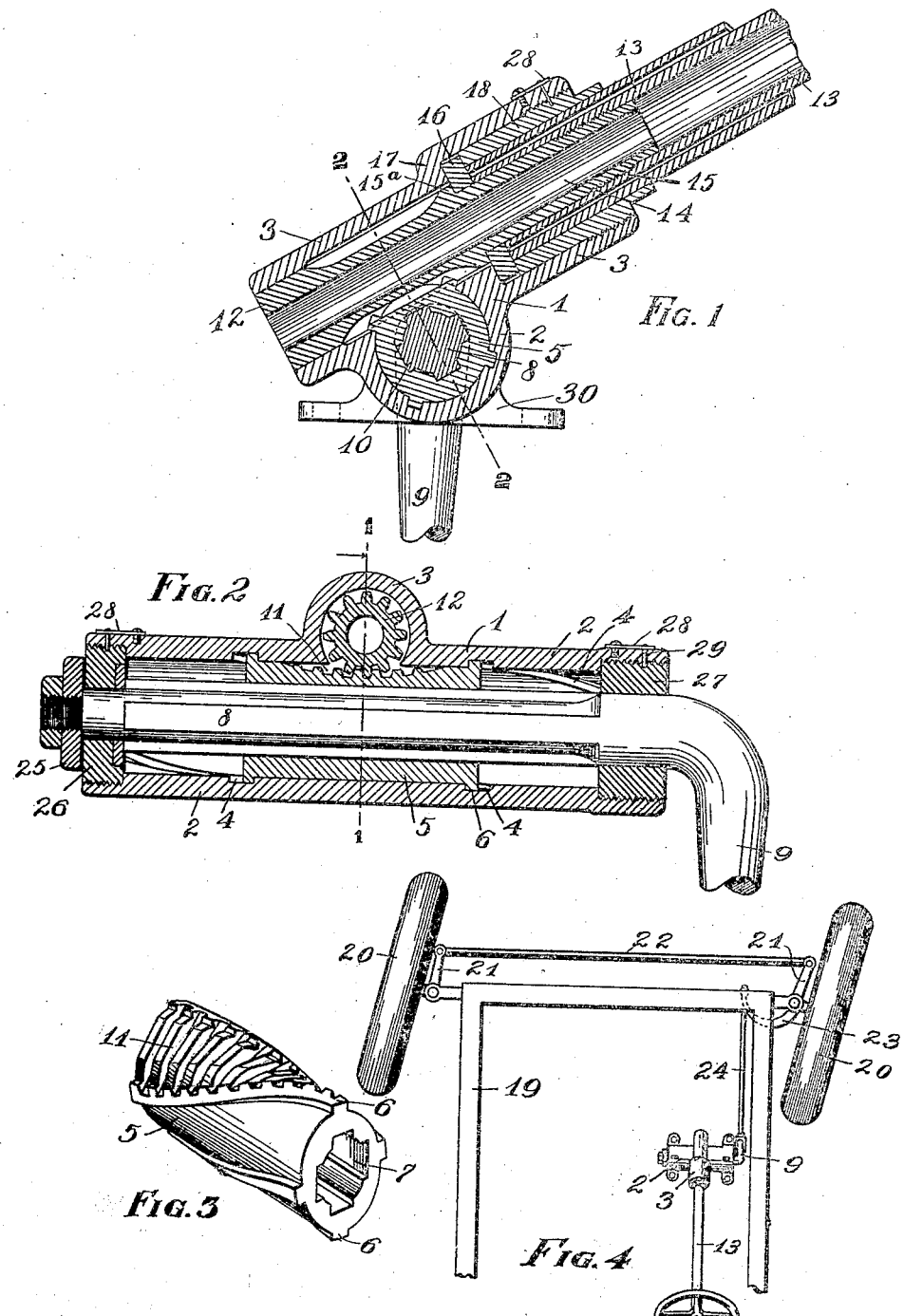

DAVID E. ROSS, OF BROOKSTON, INDIANA, ASSIGNOR TO THE ROSS GEAR AND TOOL COMPANY, OF LA FAYETTE, INDIANA, A CORPORATION OF INDIANA.

STEERING-GEAR FOR VEHICLES.

No. 879,414.　　　Specification of Letters Patent.　　　Patented Feb. 18, 1908.

Application filed May 10, 1907. Serial No. 372,854.

*To all whom it may concern:*

Be it known that I, DAVID E. ROSS, residing at Brookston, in the county of White and State of Indiana, have invented a certain new and useful Improvement in Steering-Gear for Vehicles, of which the following is a full, clear, and exact description, reference being had to the accompanying drawings.

This invention relates to steering mechanism for automobiles and the like, and it has for its object the production of a device of this character as shall be securely locked against backward movement, and that shall be simple in construction, efficient in operation, and compact in structure.

In my application filed May 14, 1906, Serial No. 316,594, I disclosed a steering gear for vehicles that embodies some of the principles of my present invention; but in that case, the crank arm that is connected to the steering knuckles operates in a plane transverse to the body of the vehicle. In my present invention this crank arm operates in a plane that is longitudinal of the body of the vehicle, which construction is preferable to the other for the reason that the steering column is capable of a wider range of location.

In the accompanying drawings forming a part of this application, Figure 1 is a longitudinal section through the steering column, the same being taken on line 1—1 of Fig. 2. Fig. 2 is a longitudinal section through the housing, the same being taken on line 2—2 of Fig. 1. Fig. 3 is a perspective view of the nut or member which travels and rotates in the housing, and Fig. 4 is a plan view of the front end of an automobile showing the manner in which my invention is applied to such a vehicle.

It will be understood that steering gears for automobiles and the like are required to be so constructed that if one of the ground wheels should strike an obstruction, the course of the automobile will not be deflected. In order to insure against such deflection, I use two members which are threaded together by long threads in such manner that, when the power is applied in one direction, said members may be easily moved longitudinally of each other, so as to produce a rotation in one of said members, but when the power is applied in the reverse direction, the said members will resist such turning movement.

Taking up a more detailed description of the invention by reference to the drawings, 1 is a housing that is composed of two tubular members 2 and 3 which extend at right angles to each other. The part 2 of the housing is provided on its interior with spiral grooves or threads 4, said threads being of long pitch. Within said part 2 I provide a tubular nut or member 5, the same being shown in perspective in Fig. 3. This member is provided on its exterior with spiral ribs 6 which fit into the threads or grooves 4 in the housing. From this description it will be understood that, the housing being held against rotation, a longitudinal movement of the member 5 will also cause said member to rotate within the housing.

The member 5 has a longitudinal opening 7 therein, said opening being designed to receive with a sliding fit the horizontal arm 8 of the steering crank 9. This horizontal arm is provided with longitudinal ribs 10 which fit into the opening 7 so that any rotation of the member 5 will produce a corresponding swinging movement of the crank. The arm 8 and the ribs thereon are considerably longer than the member 5 so that the latter may have longitudinal motion on said arm. It will be understood that the arm 8 and the opening 7 may be square or any other shape in section so long as the rotation of the member 5 produces a corresponding rotation of the arm.

In order to produce the longitudinal movement of the member 5 within the housing, I provide said member with transverse grooves 11, as shown in Fig. 3. These grooves and the portions therebetween are in effect gear teeth, and the member 5 is a rocking rack-bar. With said teeth mesh the teeth of a pinion 12, said pinion having its bearing in the part 3 of the housing 1, the axis of said pinion being at right angles to the axis of the arm 8.

The teeth may extend continuously about the member 5, but, as the teeth on the pinion can engage with only a limited extent of such continuous teeth, there is no occasion for extending them farther than about one fourth of the circumference of the member, and the drawings show the teeth thus restricted in length. It will be understood, however, that the teeth comprising the rack will be arranged spirally along the member, corresponding with the spiral arrangement of the ribs 6, so that, as the member turns, the teeth will be in proper position for engagement by the pinion. The outer parts of the teeth 11 are flattened somewhat, as shown, in order that a substantial line of contact between the teeth and the pinion will always be provided.

The pinion 12 is secured to the lower end of the steering column 13 in any suitable manner, the drawings showing the pinion as having an extended hub or sleeve 14 that is screw-threaded at 15 into the interior of said column.

The sleeve 14 is of smaller diameter than the pinion so that an annular shoulder 15ª is provided, between which and the lower end of the steering column I place a washer 16. This washer also rests against an internal shoulder or flange 17 in the part 3 of the housing, and is held in place against said shoulder by a sleeved nut 18 that is threaded into the said part 3. This washer therefore serves to hold the pinion against longitudinal movement.

From the above description it will be understood that as the steering column 13 is rotated, which may be accomplished in any suitable manner, the pinion 12 will be rotated and will move longitudinally the rack member 5 within the part 2 of the housing. This longitudinal movement of the member 5 causes the same to turn, and thereby produce a rocking movement of the steering crank.

The application of the device to an automobile or similar vehicle is shown in Fig. 4, in which 19 is the frame of the vehicle, 20 are the front ground wheels that are mounted upon the steering knuckles 21. These knuckles are connected together by means of the bar 22 so that a movement of one knuckle will produce a corresponding movement of the other knuckle. One of said knuckles is provided with a crank arm 23, which arm is joined to the steering arm 9 by means of a connecting rod 24. The rocking movement of the steering crank, produced as hereinbefore described, will cause a corresponding rocking movement of the crank arm 23, and the vehicle wheels will thus be turned for steering.

The arm 8 of the steering crank is held in position by means of a nut 25 that is threaded upon the end of said arm, said nut bearing against an externally threaded cap-nut 26 that screws into the end of the part 2 of the housing, the arm 8 being journaled in said cap-nut. This latter nut serves not only as a means for holding the arm 8 in proper position, but as a means for preventing the entrance of dust and other matter into the housing. At the opposite end of the part 2 of the housing, the arm 8 is journaled in an exteriorly threaded cap-nut 27 that screws into the said housing, said nut also serving to prevent the entrance of dust into the housing. Any suitable means may be provided for preventing the nuts 18, 26 and 27 from accidentally turning. In the drawings, I have illustrated a device which I prefer to use, the same consisting of a flat spring 28 that is secured to the housing, the same having an inwardly extending pin 29 that is adapted to project into suitably positioned notches or holes in the said nuts. By simply forcing outwardly the springs, the pins will disengage the nuts and the latter may then be turned, as desired.

In order to secure the housing to the vehicle, I provide the part 2 of the housing with a suitable base plate 30, through which the same may be bolted to the vehicle.

While I have shown and described my preferred form of construction, the details of the same may be modified, and I desire it to be understood that the following claims are not limited to the details shown any further than is made necessary by the express language of the following claims.

Having described my invention, I claim:

1. In a vehicle, ground wheels, a rack, a pinion meshing with said rack for moving the same longitudinally, means for turning said rack as it is thus moved, and connections between said rack and said ground wheels whereby the turning movement imparted to the rack turns the wheels for steering the vehicle.

2. In a vehicle, ground wheels, a rack, a pinion meshing with said rack for moving the same longitudinally, means for turning said rack as it is thus moved, a steering column connected with the pinion for turning the same, a crank connected with and turned by said rack, and connections between said crank and said ground wheels whereby the turning movement imparted to the rack turns the wheels for steering the vehicle.

3. In steering mechanism for vehicles, a housing that is provided with interior screw threads, a member within said housing engaging with said screw threads, means for moving said member longitudinally in the housing, whereby the said screw threads cause the member to turn, ground wheels, and connections between said member and said ground wheels, whereby the turning movement imparted to said member will also turn the wheels for steering the vehicle.

4. In steering mechanism for vehicles, a housing that is provided with interior screw threads, a rack within said housing having means projecting into said screw threads, a pinion engaging with said rack for moving the latter longitudinally in the housing, whereby the said screw threads cause the rack to turn, ground wheels, and connections between said rack and said ground wheels whereby the turning movement imparted to said rack will also turn the wheels for steering the vehicle.

5. In a steering mechanism for vehicles, a housing that is provided on its interior with spirally arranged grooves, a member within said housing, said member having projecting parts extending into the grooves of the housing, said member also being provided with transverse grooves forming gear teeth, a pinion journaled in the housing and meshing with said transverse grooves, a steering column connected with said pinion, ground wheels, and connections between said member and said wheels, the construction being such that, as the pinion is turned by the steering column, the member will be moved longitudinally in the housing and will be caused to turn therein by the grooves on the housing, which turning movement, will, through the connections with the ground wheels, turn the latter for steering the vehicle.

6. In steering mechanism for vehicles, a housing that is provided on its interior with spirally arranged grooves, a tubular member within said housing, said member having projecting parts extending into the grooves of the housing, said member also being provided with transverse grooves forming gear teeth, a pinion journaled in the housing and meshing with said grooves, means for turning said pinion, a crank member extending through the tubular member and being adapted to turn therewith, ground wheels, and connections between said crank member and said wheels, the construction being such that, as the pinion is turned, the member will be moved longitudinally in the housing and will be caused to turn therein by the grooves on the housing, which turning movement will, through the crank member and its connections with the ground wheels, turn the latter for steering the vehicle.

7. In a steering mechanism for vehicles, a housing that is provided on its interior with spirally arranged grooves, a rack within said housing, said rack having parts projecting into the grooves of the housing, a pinion journaled in said housing and engaging said rack, a steering column for turning said pinion, ground wheels, a crank connected with said rack, and connections between said crank and said ground wheels, the construction being such that, as the pinion is turned, the rack will be moved longitudinally and the grooves in the housing will cause the crank to be turned, whereby, through its connections with the ground wheels, the latter will be turned for steering the vehicle.

8. In steering mechanism for vehicles, a housing having two tubular parts with their axes in planes at right angles to each other, one of said parts being provided on its interior with spirally arranged grooves, a rack within said part, said rack having projecting portions extending into the grooves of the housing, a pinion journaled in the other tubular portion of the housing, said pinion meshing with the rack, a steering column connected with said pinion, ground wheels for the vehicle, and connections between the rack and said ground wheels, the construction being such that, when the steering column is turned, the pinion will move the rack longitudinally within the housing, while the grooves in the latter will turn the rack and thus, through its connections with the ground wheels, turn said wheels to steer the vehicle.

9. In steering mechanism for vehicles, a housing having two tubular parts with their axes in planes at right angles to each other, one of said parts being provided on its interior with spirally arranged grooves, a tubular rack within said part, said rack having projecting portions extending into the grooves of the housing, a pinion journaled in the other tubular portion of the housing, said pinion meshing with the rack, a steering column connected with said pinion, a crank member extending through the tubular rack, the rack sliding upon but turning said member, ground wheels for the vehicle, and connections between the crank member and said ground wheels, the construction being such that, when the steering column is turned, the pinion will move the rack longitudinally within the housing, while the grooves in the latter will turn the rack and the crank member, and thus, through the connections with the ground wheels, turn said wheels to steer the vehicle.

10. In steering mechanism for vehicles, a housing that is formed of two tubular portions, the axes of said portions being in planes at right angles to each other, one of said tubular portions being provided on its interior with spirally arranged grooves, cap-nuts closing the ends of that portion of the housing having the grooves, a crank arm journaled in said cap-nuts, said arm being provided with a steering crank, ground wheels for the vehicle, connections between said ground wheels and said steering crank, a rack member within that portion of the housing carrying the crank arm, said rake member engaging with said arm and with the spiral grooves in the housing, a pinion engaging with the rack member, said pinion being journaled in the other tubular portion of the housing, and means for turning said pinion, the construction being such that, as the pinion is turned, the rack member will be moved longitudinally within the housing and will slide upon said crank arm, the grooves in the housing turning the member and the crank arm, which through its connections with the ground wheels, turns the latter for steering.

11. In steering mechanism for vehicles, a housing that is formed of two tubular portions, the axes of said portions being in planes at right angles to each other, one of said tubular portions being provided on its interior with spirally arranged grooves, cap-nuts closing the ends of that portion of the housing having the grooves, a crank arm journaled in said cap-nuts, said arm being provided with a steering crank, ground wheels for the vehicle, connections between said ground wheels and said steering crank, a tubular rack member within that portion of the housing carrying the crank arm, said rack member sliding upon and turning said arm and engaging with the spiral grooves in the housing, a pinion engaging with the rack member, said pinion being journaled in the other tubular portion of the housing, and a steering column for turning said pinion, the construction being such that as the pinion is turned the rack member will be moved longitudinally within the housing and will slide upon said crank arm, the grooves in the housing turning the member and the crank arm, which, through its connections with the ground wheels, turns the latter for steering.

12. In steering mechanism for vehicles, a housing that is provided on its interior with spirally arranged grooves, a rack member within said housing and engaging with said grooves, a pinion engaging with the said rack member for moving the latter longitudinally in the housing, means for turning said pinion, whereby as the pinion is turned, the rack member will be moved longitudinally and will be caused to rotate as it is thus moved, cap-nuts closing the ends of the housing, a crank arm journaled in said cap-nuts, said crank arm passing through the rack member and engaging the same in such manner that the rotation of said member will turn the crank arm, ground wheels for the vehicle, and connections between said ground wheels and the crank arm, whereby the turning movement imparted to the crank arm by the rack member will turn the ground wheels for steering.

13. In steering mechanism for vehicles, a housing that is provided on its interior with spirally arranged grooves, a rack member within said housing and engaging with said grooves, a pinion engaging with the said rack member for moving the latter longitudinally in the housing, means for turning said pinion, whereby as the pinion is turned, the rack member will be moved longitudinally and will be caused to rotate as it is thus moved, cap-nuts closing the ends of the housing, means for holding said cap-nuts from accidental turning, a crank arm journaled in said cap-nuts, said crank arm passing through the rack member whereby the rotation of said member will turn the crank arm, ground wheels for the vehicle, steering knuckles upon which said wheels are journaled, and connections between said crank arm and the steering knuckles whereby the turning movement imparted to the crank arm by the rack member will turn the ground wheels for steering.

14. In steering mechanism for vehicles, a housing that is provided on its interior with spirally arranged grooves, a tubular rack member within said housing and engaging with said grooves, a pinion meshing with said rack member for moving the latter longitudinally in the housing, means for turning said pinion, whereby, as the pinion is turned, the rack member will be moved longitudinally and will be caused to rotate as it is thus moved, cap-nuts closing the ends of the housing, springs mounted on the housing, pins on said springs passing through the housing and engaging with the cap-nuts to prevent the latter from accidentally turning, a crank arm journaled in said cap-nuts, said crank arm passing through the tubular rack member so that the rotation of said member will turn the crank arm, ground wheels for the vehicle and connections between said crank arm and said ground wheels, whereby the turning movement imparted to the crank arm by the rack member will turn the ground wheels for steering.

15. In steering mechanism for vehicles, a housing formed of two tubular parts with their axes in planes at right angles to each other, one of said parts being provided on its interior with spirally arranged grooves, a rack within said part, said rack having projecting portions extending into the grooves of the housing, a pinion journaled in the other tubular portion of the housing, said pinion meshing with the rack, that portion of the housing containing the pinion being provided with an interior shoulder, a washer engaging the pinion and said shoulder, a steering column secured to said pinion and engaging with said washer, a sleeved nut screwed into the housing and holding said washer against the said shoulder of the housing, whereby the pinion is held in position, a spring secured to the housing, a pin upon said spring, said pin passing through the housing and engaging with the sleeved nut to prevent the latter from accidentally turning, ground wheels for the vehicle and connections between said ground wheels and said rack such that, as the pinion is turned and the rack is moved within the housing, the rack will turn and thereby turn the ground wheels for steering.

In testimony whereof, I hereunto affix my signature in the presence of two witnesses.

DAVID E. ROSS.

Witnesses:
D. E. Ross,
JOSEPH HORAT.

Correction in Letters Patent No. 879,414.

It is hereby certified that the name of the first-mentioned witness in Letters Patent No. 879,414, granted February 18, 1908, upon the application of David E. Ross, of Brookston, Indiana, for an improvement in "Steering-Gear for Vehicles," was erroneously printed "D. E. Ross," whereas the said name should have been printed "D. L. Ross;* and that the said Letters Patent should be read with this correction therein that the same may conform to the record of the case in the Patent Office.

Signed and sealed this 10th day of March, A. D., 1908.

[SEAL.] C. C. BILLINGS,
*Acting Commissioner of Patents.*